J. D. JONES.
SELF OILING BEARING PIN.
APPLICATION FILED JAN. 22, 1920.

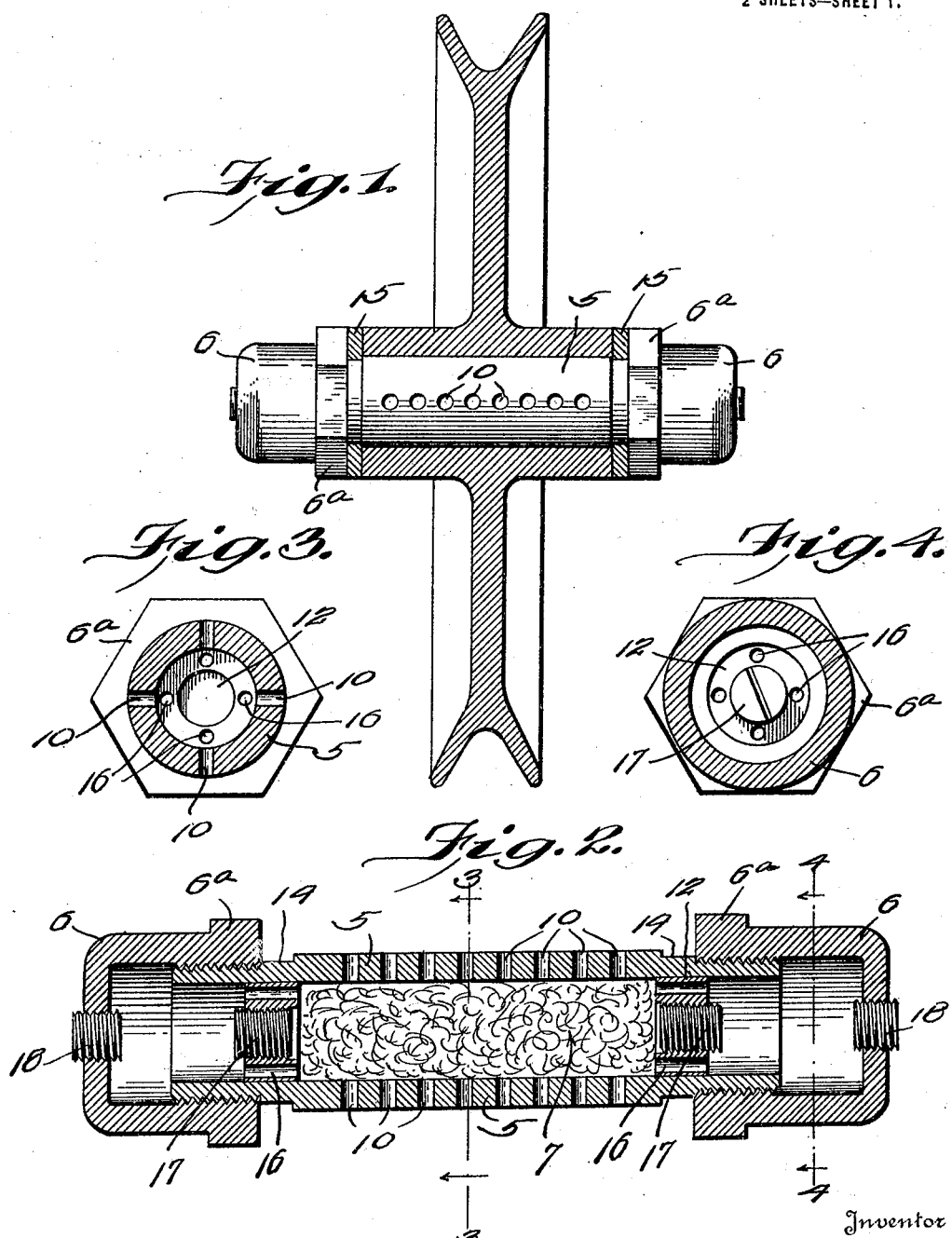

1,413,029.

Patented Apr. 18, 1922.
2 SHEETS—SHEET 2.

Inventor
John D. Jones,

Witness
R. P. Gardner.

By
Eugene C. Brown
Attorney

UNITED STATES PATENT OFFICE.

JOHN D. JONES, OF WALLA WALLA, WASHINGTON, ASSIGNOR TO SELF-OILING BEARING COMPANY, OF WALLA WALLA, WASHINGTON, A CORPORATION OF WASHINGTON.

SELF-OILING BEARING PIN.

1,413,029.  Specification of Letters Patent.  Patented Apr. 18, 1922.

Application filed January 22, 1920. Serial No. 353,229.

*To all whom it may concern:*

Be it known that I, JOHN D. JONES, a citizen of the United States, residing at Walla Walla, in the county of Walla Walla and State of Washington, have invented certain new and useful Improvements in Self-Oiling Bearing Pins, of which the following is a specification.

This invention relates to bearing pins for sheaves, pulleys, rollers, gears, wheels, link carriers, link chains, and other devices wherein a pin or bushing forms an element of the bearing surfaces.

The purpose of my invention is to provide a bearing pin which is self-oiling and carries within itself a supply reservoir capable of furnishing oil to the bearing surfaces for a long period of time. A further object is to provide a bearing pin which will operate in any position without loss of oil, the oil reservoirs being hermetically sealed, the only escape for the oil being across the bearing surfaces.

In the following description I shall refer to the accompanying drawings in which—

Figure 5:
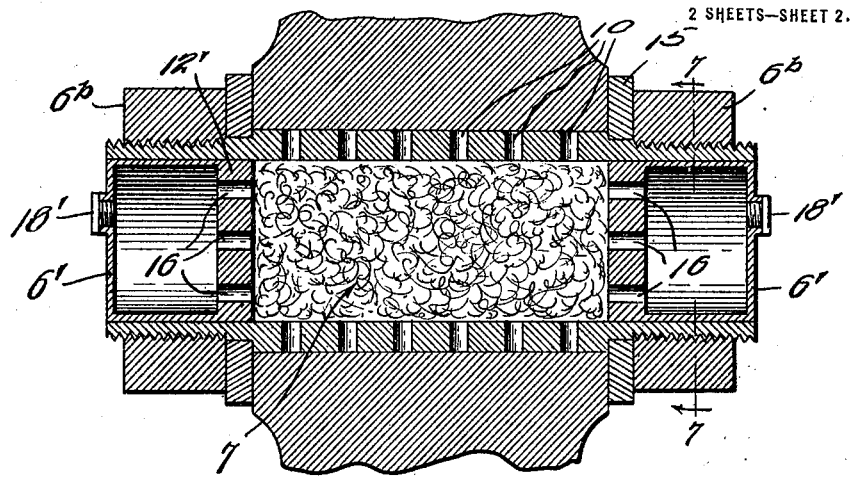
Figure 6:
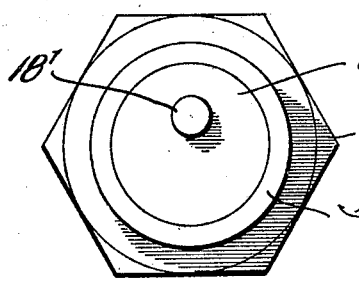
Figure 7:
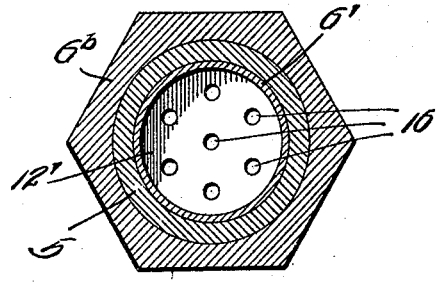
Figure 8:
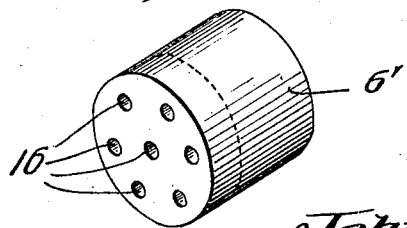

Figure 1 is a vertical sectional view of a pulley provided with a bearing pin embodying my invention; Fig. 2 is a longitudinal sectional view of the bearing pin; Figs. 3 and 4 are transverse sectional views on the lines 3—3 and 4—4, respectively, of Fig. 2; Fig. 5 is a fragmentary vertical sectional view of a pulley or sheave provided with a modified form of my bearing pin; Fig. 6 is an end view of the pin; Fig. 7 is a vertical sectional view on the line 7—7 of Fig. 5; and Fig. 8 is a perspective view of one of the oil reservoirs or containers.

The self-oiling bearing pin illustrated in Figs. 1 to 4, consists of a tubular barrel or pin proper 5, which is threaded at each end to receive the oil reservoir cups 6. The central portion of the bore of the hollow pin constitutes the oil distributing chamber and is packed with wool waste 7 which serves to distribute the lubricating oil throughout the length of the bearing surface through the apertures 10. The packing chamber is closed upon either end by plugs 12 which are driven into place with a tight fit and are positioned in alinement with the annular neck portions 14 which receive the yoke arms or other pulley or bearing supports 15. The plugs are provided with a plurality of channels or oil passages 16 and with a larger central opening through which the waste may be inserted and which is closed by a screw plug 17.

The oil reservoir cups 6 are provided with a squared or hexagonal flange, 6$^a$ by which they can be turned as they are screwed or unscrewed and they serve as retaining nuts to hold the parts of the pulley or block together. The cavities within the cups cooperate with the outer portions of the bore of the pin to form oil reservoirs. Each cup is provided with a filling aperture which is closed by a screw plug 18. After the parts have been assembled and the reservoirs have been filled with oil and closed by the plugs, the oil cannot leak out and can only find an outlet through the wool waste and the regular oiling channels to the bearing surfaces.

I have shown a slightly different construction in Figs. 5 to 8, in which the oil cups 6' are in the form of closed cylindrical boxes which are driven into the ends of the tubular pin. They are provided with thickened bases 12' which serve as plugs and reinforce the pin at the points where the yoke arms 15 or other supports surround the pin in the same manner that the plugs 12 reinforce the pin previously described. The oil filling holes are sealed by the screw plugs 18'. The parts of the pulley or block are secured together and the pin is held in position by nuts 6$^b$.

The advantages and points of superiority of my self-oiling bearing pin will be appreciated from the foregoing description of the structural parts. The oil is effectually sealed against leakage and also against the entrance of dirt regardless of the position in which the bearing may be placed. The oil must permeate the wool waste before it can pass out through the oil channels 10 to the bearing surfaces, the waste permitting only a small amount to pass and regulating the supply substantially to the lubricating necessities of the bearing. The reservoirs or cups carry a large supply of oil so that the bearing will run for a long period of time, usually extending over several years before requiring replenishing. There are no projecting oil cups which are liable to be broken off and consequently my bearing is adapted for hard usage, as for instance, for the bearing pins of logging camp blocks.

It will be evident to engineers that various changes and modifications can be made without departing in any manner from my invention as disclosed herein.

I claim:—

1. A self-oiling bearing pin, comprising a tubular member provided along its intermediate bearing portion with apertures or oil channels, enclosed oil reservoirs at each end of said member, and plugs fitting tightly within the bore of said member at each end of said intermediate portion and having passages connecting said reservoirs with the intermediate portion.

2. A self-oiling bearing pin as set forth in claim 1, the tubular member having an annular portion at each end of said bearing portion adapted to receive the pulley yoke or other supports or hangers, and the plugs positioned within the tubular member in alinement with said annular portion to serve as a reinforcement therefor.

3. A self-oiling bearing pin, comprising an intermediate bearing portion provided with oil channels, perforated plugs fitting tightly within the bore of the pin at opposite ends of said intermediate portion and serving as partitions to retain waste inserted in said intermediate portion, and oil reservoirs at opposite ends of the pin in communication with said perforated plugs.

In testimony whereof I affix my signature.

JOHN D. JONES.